Oct. 14, 1941.                E. R. GOLDFIELD ET AL                    2,259,036
                                X-RAY APPARATUS
                              Filed May 21, 1938              4 Sheets-Sheet 1

INVENTORS
EDWIN R. GOLDFIELD
EDWARD B. GRAVES
BY
Hyde, Higley & Meyer
ATTORNEYS

Oct. 14, 1941.  E. R. GOLDFIELD ET AL  2,259,036

X-RAY APPARATUS

Filed May 21, 1938  4 Sheets-Sheet 2

INVENTORS
EDWIN R. GOLDFIELD
EDWARD B. GRAVES
BY
Hyde, Higley & Meyer
ATTORNEYS

Oct. 14, 1941.  E. R. GOLDFIELD ET AL  2,259,036
X-RAY APPARATUS
Filed May 21, 1938  4 Sheets-Sheet 3

INVENTORS
EDWIN R. GOLDFIELD
EDWARD B. GRAVES
BY
Hyde, Higley & Meyer
ATTORNEYS

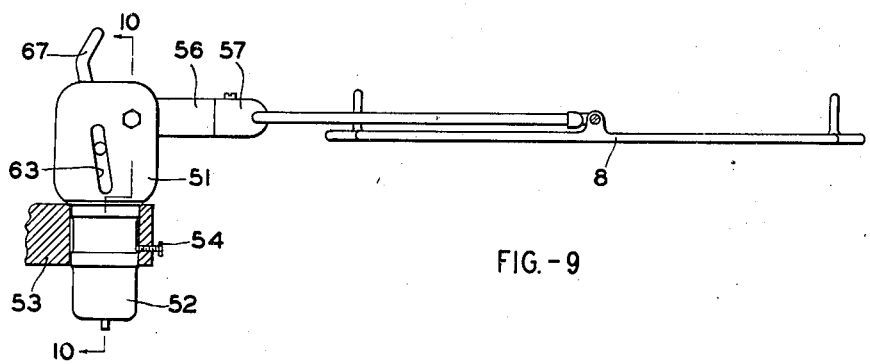
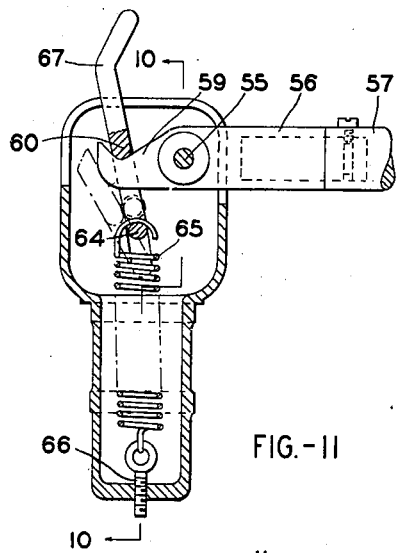
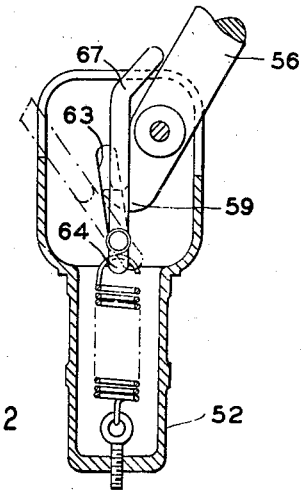
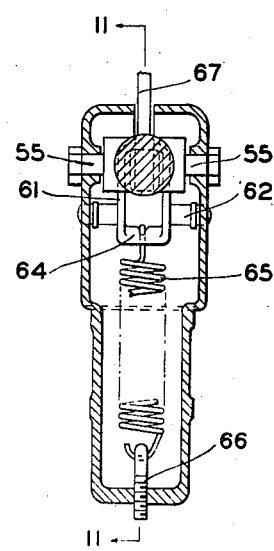

Patented Oct. 14, 1941

2,259,036

UNITED STATES PATENT OFFICE 2,259,036

X-RAY APPARATUS

Edwin R. Goldfield, University Heights, and Edward B. Graves, South Euclid, Ohio, assignors to Picker X-Ray Corporation Waite Manufacturing Division, Inc., Cleveland, Ohio, a corporation of Ohio Application May 21, 1938, Serial No. 209,316

15 Claims. (Cl. 250—57)

This invention relates to X-ray apparatus of tilting table type, such as is used for both radiography and fluoroscopy.

One object of the invention is generally to improve such apparatus both by simplification and by reduction in weight and cost without sacrifice of any of the advantages or curtailment of any field of use of more complicated or costly apparatus for the purpose, the various parts being organized and arranged for simple and convenient adjustment or manipulation without imposing heavy or unusual strains upon the operator.

Another object of the invention is to simplify the apparatus by utilizing the tilting table itself as a support for a traversing carriage upon which are mounted a tube stand and a single X-ray tube used both for fluoroscopy and radiography, together with the cooperating fluoroscopic screen unit, which stand and unit nevertheless are associated for their customary conjoint or independent use notwithstanding omission of the usual separate heavy guide rails or supports upon which they travel.

A further object is to provide improved apparatus of this kind which dispenses with the usual separate heavy rail mounted stand and thus clears away and reduces to a minimum the floor space occupied by the apparatus.

Another object is to provide proper counterbalancing means both for the traversing carriage and for the tube stand and screen unit mounted upon it, so that these movable parts may be easily and readily adjusted by the operator independently of their respective actual weights, that also being true whether the table is in either horizontal or vertical position, or is tilted to any intermediate or other angular position.

A further object is to so counterbalance all of the movable or adjustable parts of the apparatus as to make them semi-automatic in operation, compelling them to assume their respective proper positions more or less automatically and without conscious effort or direction by the operator, and also eliminating interference of the several parts with each other or with the table.

A further object is to provide apparatus of this kind including a tilting table and a fluoroscopic screen unit mounted for traversing movement upon and across the table, together with counterbalancing means for said unit capable of readily being made effective or ineffective in accordance with the position of the table, thereby to relieve the operator of otherwise heavy duty in manipulating said unit.

A further object is to provide improved counterbalancing means for the tube and its stand, embodying over-center mechanism effective to hold the tube in proper position opposite either the exposed front face or the rear or reverse face of the table, in accordance with the desired use of the tube.

A further object is to provide improved gravity counterbalancing means for the traversing carrier which without manipulation is fully effective when the table is vertical, but which is ineffective when it is horizontal.

Further objects of the invention are in part obvious and in part will appear more in detail hereinafter.

In the drawings, which represent one suitable embodiment of the invention,

Fig. 9 is a detail elevation, on a larger scale, illustrating the mounting for the screen unit;

Fig. 10 is a sectional elevation on approximately the line 10—10, Figs. 9 and 11;

Fig. 11 is a sectional elevation on approximately the line 11—11, Fig. 10, showing in full lines the arm and counterbalancing spring engaged in operative condition; and Fig. 12 is a similar view, illustrating the disengaging operation.

Figure 1:
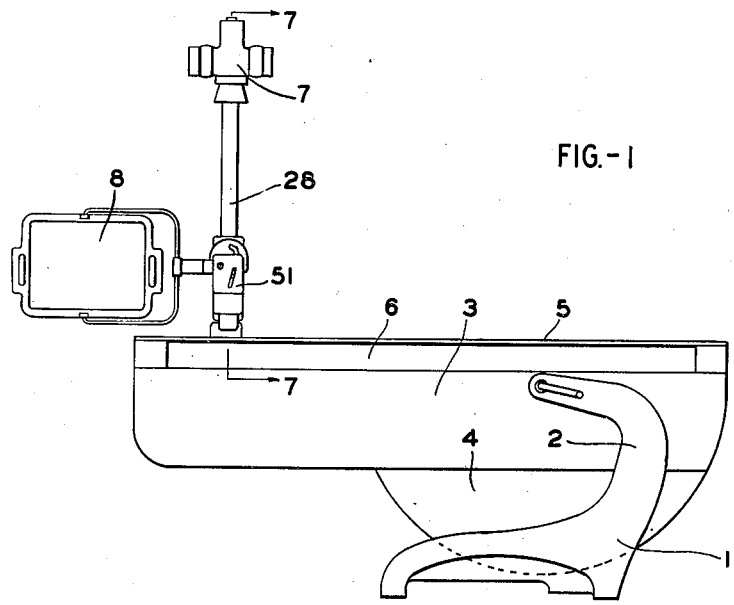
Fig. 1 is a side elevation, illustrating the table in horizontal position with the tube and tube stand above it, and with the screen unit above the table but turned out of the way at one side.

The apparatus shown in the drawings comprises a suitable heavy base or frame 1 designed to rest upon the floor or other suitable support and provided with opposite arms 2 in which is journalled or mounted the tilting table marked generally 3 provided with the usual gravity counterweight 4. The table mounting is of the usual form permitting it to be tilted either into the horizontal position shown in Fig. 1, the vertical position shown in Fig. 2, or any intermediate or the Trendelenberg position, with the ability to lock it in any of said positions or quickly release it and shift it to another position, as is usual. Said table is provided with the usual plate top 5 upon or against which the patient is supported and beneath which is the usual Bucky diaphragm cavity 6.

Cooperating with the able are the usual X-ray tube 7 and fluoroscopic screen 8, which are suitably mounted for either conjoint or independent use, depending upon whether the operation is fluoroscopic or radiographic. But one X-ray tube mounting is used, whether the apparatus is employed for either fluoroscopy or radiography, separate mountings for two tubes being therefore unnecessary. Usually the tube and its stand and the screen unit heretofore have been mounted upon heavy rails or supports mounted independently of the table in a position where they block foot space and increase the over-all floor area occupied by the machine. To minimize occupied space and to reduce weight and cost and simplify operation, we have so arranged the parts of the present apparatus as to utilize the tilting table itself, instead of a relatively stationary frame or support, as the support for the single tube stand and screen unit. In other words, said stand and unit are mounted for adjustment to various positions across and along the table area and the tube to position either on the front or on the rear face thereof, but said tube and unit, together with the supporting carriage therefor, further travel as a unit with the table during tilting motion thereof, as will more fully hereinafter appear. This arrangement necessitates special counterbalance means to be later described.

Figure 3:
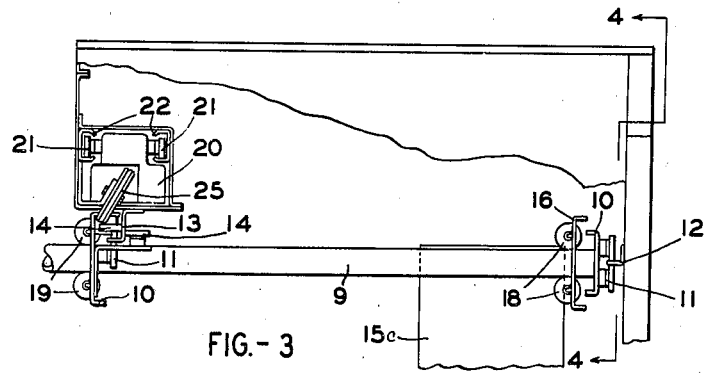
Fig. 3 is a detail end elevation of a part of the table as viewed from its head end, to-wit, the left-hand end in Fig. 1, parts being broken out to expose interior parts.
Figure 4:
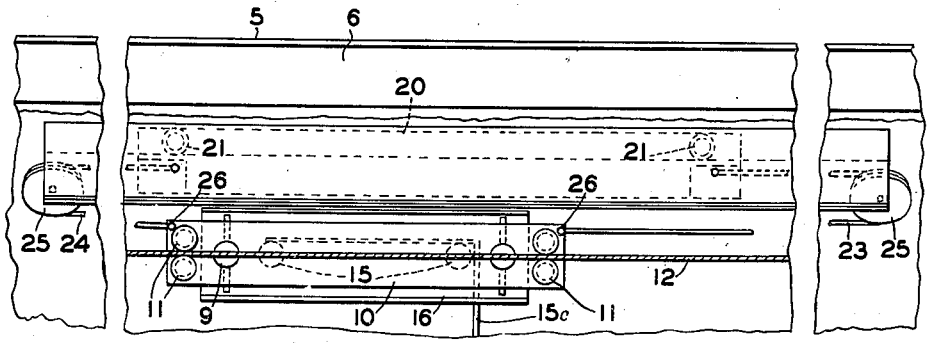
Fig. 4 is a detail sectional elevation on approximately the line 4—4, Fig. 3, looking in the direction of the arrows.
Figure 5:
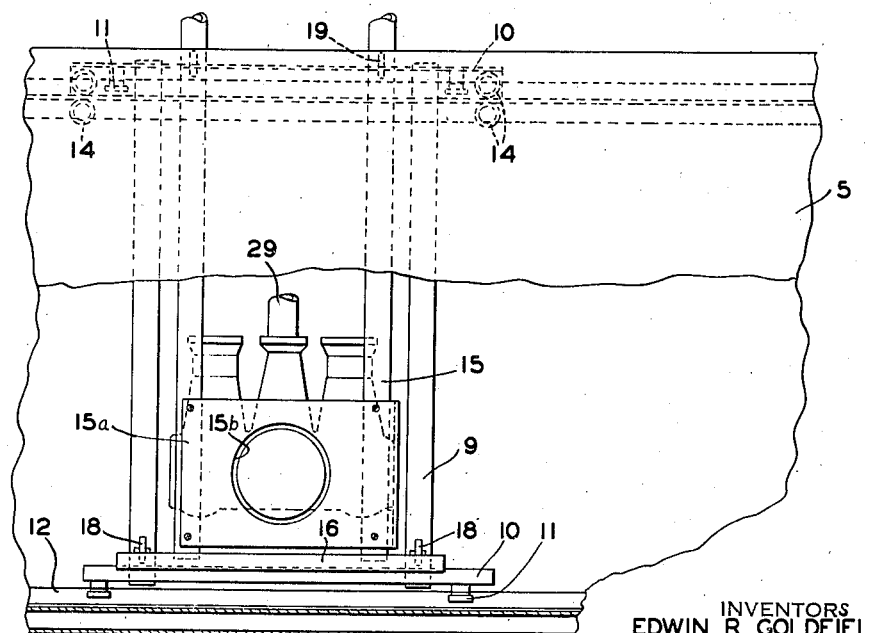
Fig. 5 is a detail plan view of the table, partly broken out to expose underlying parts.

The support for the movable or adjustable parts of the apparatus, including the tube stand and the screen unit, is a carriage shown somewhat in detail, Figs. 3, 4 and 5. Said carriage comprises rods 9 extending transversely of the table and rigidly connected by end members 10 forming a rectangular frame, the end members 10 being provided with anti-friction members, such as rollers 11, riding upon and beneath the horizontal flanges of standard steel rail members 12, 13 secured to the table, and which form tracks along which the carriage travels endwise of the table. Other rollers, such as those indicated at 14, take up lateral thrust and prevent side movement of said carriage.

The rods 9, usually of tubular form, serve as guides to support a sub-carriage consisting of rods or tubes 15 rigidly connected at their inner ends by an end head 16 and at their outer ends by a head 17. The end head 16 is provided with anti-friction members, such as rollers 18, travelling on the rods 9, and the outer end head 10 of the main carriage is provided with rollers 19 between which the rods 15 slide, so that the sub-carriage is guided for right line movement crosswise upon the main carriage and the main carriage is guided for right line movement back and forth along the table, as will be readily understood.

Figure 2:
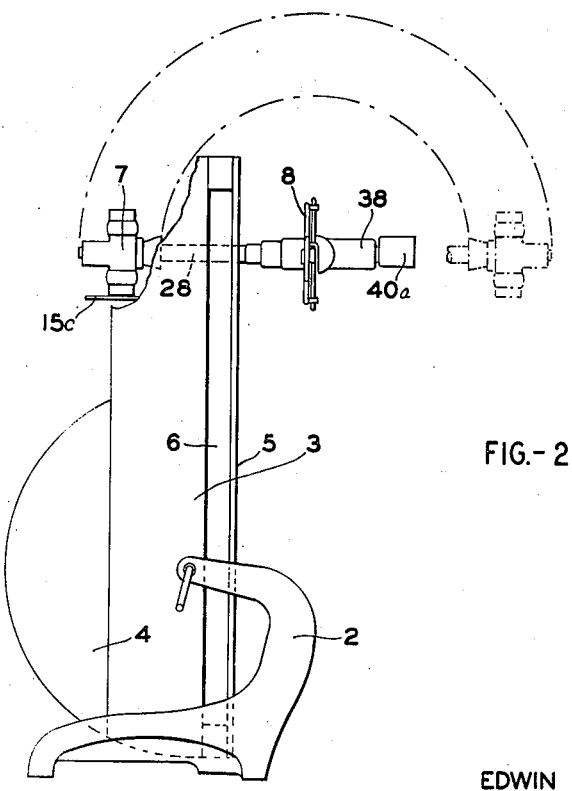
Fig. 2 is a similar view, showing the table in vertical position and the tube stand and screen unit in full lines in their positions when used for fluoroscopy.

The sub-carriage referred to serves as the support for both the tube stand and tube and for the fluoroscopic screen unit, both of which are quite heavy members or assemblies, so that the total weight of the group of parts movable with the carriage is considerable. Obviously, when the table is in vertical position, as shown in Fig. 2, the movable parts as a group would drop to the lower or foot end of the table, so that counterbalance means is necessary to enable the tube and screen to be located and to remain at any desired level. For this purpose we have provided gravity counterbalance means effective to the full extent when the table is in vertical position, but ineffective and which does not impede adjustment of the parts when the table is in horizontal position. The counterbalance means comprises a suitable weight, shown as a long, heavy metal or other bar 20 provided with anti-friction members, such as rollers 21, travelling in guideways 22 in a walled off portion of the space beneath the table, the counterweight being connected at its opposite ends to cables 23, 24 travelling over pulleys 25 and attached at their other ends, as at 26, to the outer end head 10 of the main carriage.

It will be readily understood that when the table is in horizontal position the main carriage may be moved back and forth lengthwise of the table, dragging with it the counterweight, which moves in the opposite direction, but said counterweight travels on anti-friction rollers and is movable with very little effort. Therefore it impedes in no way free adjustment of the carriage along the table. However, when the table is tilted to an inclined or to the vertical position shown in Fig. 2 the counterweight becomes increasingly effective and finally of full effect, fully counterbalancing the weight of the main and subcarriage and all movable parts, so that they may be adjusted up and down as readily as when they were adjustable horizontally in the former table position.

Of course, the lateral motion of the subcarriage cross-wise of the table upon the main carriage is utilized for lateral adjustment of either or both of the tube and screen units with respect to the patient.

Rods 15 of the sub-carriage may be connected by a plate 15a having a beam aperture 15b and also carrying a depending shelf or wall 15c, which serves as a stop and support for the X-ray tube in its position for fluoroscopic use, as will later appear.

Figure 7:
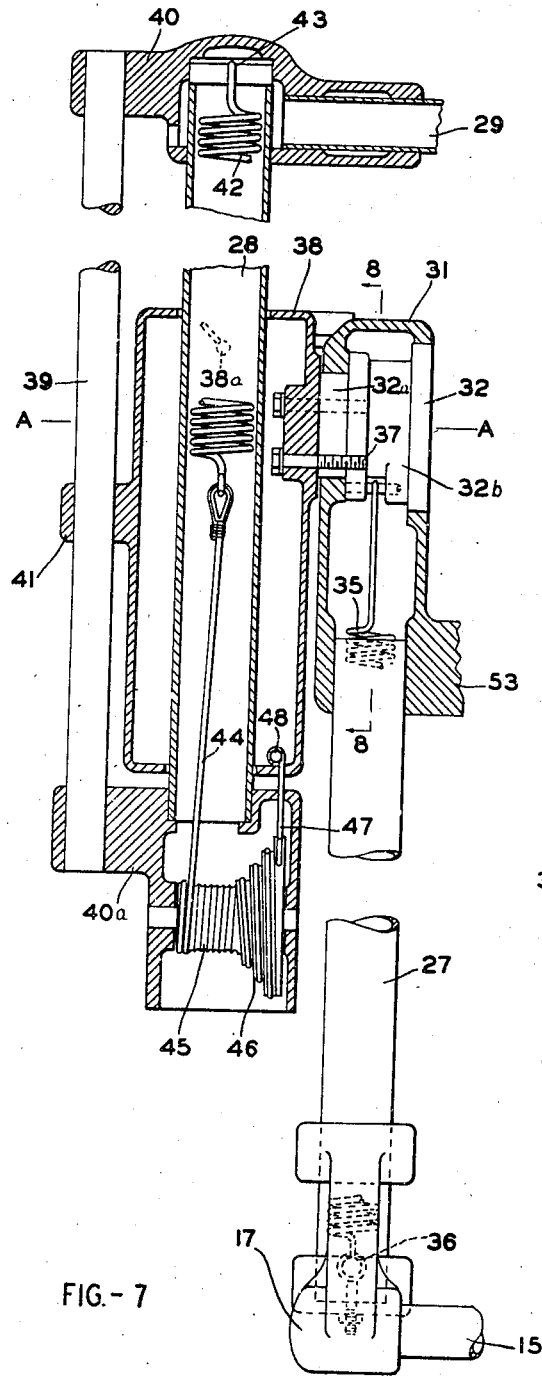
Fig. 7 is a detail sectional elevation of the tube stand and counterbalancing springs, the section being taken on approximately the line 7—7, Fig. 1.
Figure 6:
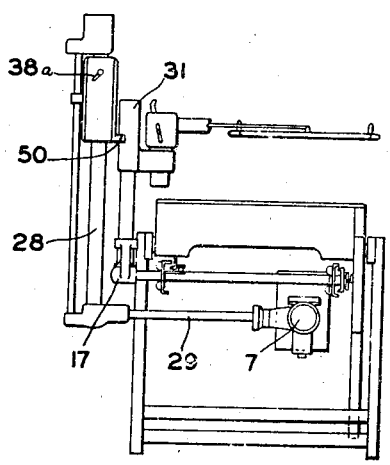
Fig. 6 is an end elevation of the apparatus as viewed from the left in Fig. 1, the tube stand and screen unit being shown in position for use in horizontal fluoroscopy.

Speaking now of the tube and tube stand, generally illustrated in Figs. 6 and 7, the tube stand includes a column 27 of tubular form mounted upon the sub-carriage head 17. Said column extends upwardly from the sub-carriage to a position above the level of the table top when horizontal and at its upper end the column is provided with a hollow head 31 forming supporting means in which is mounted for adjustment about a horizontal axis a pillar 28 also of tubular form provided at its upper or outer end with an arm 29 extending over the table top and at its outer end supporting the X-ray tube 7. The tilting or swinging adjustment of the tube carrying pillar 28, before referred to, is about a horizontal axis indicated approximately by the line A—A Fig. 7 and involves parts which are constructed and arranged as follows:

The mounting of pillar 28 in the head 31 may be such that while it can turn about the axis A—A, the X-ray tube 7 always remains at the same distance from said axis, which is a simple construction satisfactory for many purposes. However, in some cases it is desirable to have the tube adjustable toward and from said axis to enable it to be moved to various distances from the patient, for which purpose we mount pillar 28 for sliding adjustment.

Figure 8:
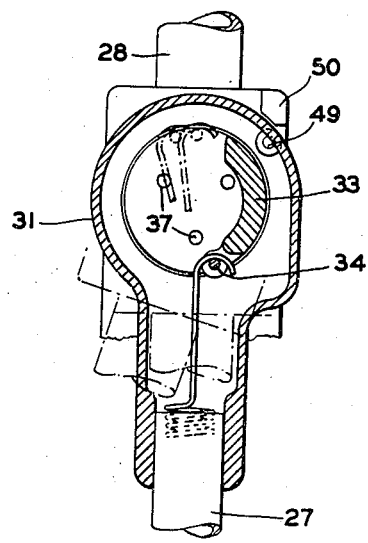
Fig. 8 is a detail view, from the right in Fig. 7, illustrating the operation of a counterbalancing cam, the parts being in section on approximately the line 8—8, Fig. 7.

Column 27 at its upper end is provided with a hollow head 31 in opposite walls of which are mounted the two cheeks 32, 32a of a support 32b whose central portion is cut away so as to leave permanent or solid connection between said cheeks only at one side of the center, the connecting bridge being indicated in cross section at 33, Fig. 8. Said cheeks are connected by a pin 34 to which is connected a loop at one end of a tension spring 35 housed within the column 27, the other end of said spring being fastened in the column at 36.

Support 32b has attached thereto, as by bolts 37, a hollow casing 38 through openings in which the pillar 28 slides to provide the described adjustment. Rotation of the pillar and of the arm 29 carried thereby, around the pillar axis, may be prevented in any suitable manner, as by a guide rod 39 parallel to the pillar and connected at one end to a head 40 in which arm 29 is mounted and at its opposite end to a housing 40a attached to the pillar 28, the rod 39 sliding through a guide 41 mounted upon the casing 38.

While the weight of the pillar and other parts may be counterbalanced by a gravity or weight effect, we prefer to employ a spring counterbalance. Within the pillar 28 is housed a tension spring 42 having one end fixedly connected at 43 in head 40 and its opposite end provided with an eye to which is connected one end of a flexible cable 44 wound upon the cylindrical portion 45 of a pulley journalled in the housing 40a, said pulley having tracks on a tapered portion 46 thereof in which is laid a cable 47 attached at 48 to a portion of the casing 38.

The purpose of the spring 42 is to counterbalance the weight of the tube supporting pillar 28, the arm 29 and the tube 7 and those parts which move with them relative to the casing 38 when the table is horizontal and the pillar 28 is vertical, as shown in Fig. 1.

The pulley 45, 46 operates after the manner of a lever with one arm (the cylindrical portion 45) of unvarying length and the other arm (conical portion 46) of variable length. The variation in the effective arm length of portion 46 is according to Hooke's law. Therefore, assuming that when pillar 28 is fully extended with the X-ray tube in its uppermost position, as in Fig. 7, the spring 42 has sufficient tension to fully counterbalance all parts, uniform increments of extension of said spring are accompanied by uniform decreases in length of the lever arm at 46, so that the moment or resultant of the spring counterbalancing force is always the same. The pillar 28, with all parts carried by it, therefore will remain in any position to which it is adjusted, assuming the table is in horizontal position.

If desired, casing 38 may have threaded through its wall a clamp screw 38a bearing against the pillar 28. Whatever be the position of the tube, whether near to or far from the table top, when the tube supporting pillar 28 and casing 38 are turned around the axis A—A to move the tube to a position beneath the table, as shown in Fig. 6, progress of the tube 7 toward a horizontal position more and more decreases the weight necessary to be counterbalanced by spring 42 until, as the pillar 28 approaches the horizontal position, the weight to be counterbalanced approaches zero and the spring exerts an increasing tendency to restore the pillar 28 to its full outward position, automatically insuring that the X-ray tube will clear and not engage the end of the table in passing around the same to its position beneath the table shown in Fig. 6. Such adjustment of the tube to a position beneath the table is made when the main carriage has been moved to its extreme position nearest the head end of the table, in which position the X-ray tube will just safely pass the end of the table without engaging the same, provided the tube is out at its extreme position, as will be readily understood.

When the tube reaches its position beneath the table, as shown in Fig. 6, obviously both the spring 42 and the weight of the parts are acting in the same direction to hold the tube in its extreme lowest position.

The purpose of spring 35 is to counterbalance the pillar 28 and its associated parts with respect to their rotative adjustment about the axis A—A, Fig. 7. It will be observed that in the position shown in Fig. 7, corresponding to the full line position of the parts Fig. 8, the pin 34 is to one side of a line joining the axis A—A and the lower end 36 of spring 35. Consequently said spring is effective on pin 34 and upon the rotatable member 32b acting to turn it and its associated parts in the clockwise direction, Fig. 8. In this position the pillar 28 is directly upright (assuming the table horizontal) and it is held in such position by a suitable pin lock such as indicated conventionally at 49. By pulling out the pin the pillar 28 may be turned in either direction about axis A—A. If turned to the right, Fig. 8, the X-ray tube swings over and somewhat approaches the surface of the table top, enabling it to be used down at the foot end of the table beyond the actual range of movement of the traversing carriage. If turned in the opposite direction, or to the left in Fig. 8, it may be used at the head end of the table in the same manner, or it may be moved clear down until it is dependent below the table. This motion may be initiated by a muscular effort of five to ten pounds, and such pressure if continued will turn the pillar around the axis A—A until when substantially horizontal the weight of the pillar and parts carried thereby begins to overbalance the strength of spring 35. Upon further movement of the arm, when the pillar 28 reaches a position within ten or twenty degrees of being directly below the axis A—A, the pin 34 passes beyond the dead center and a reverse or negative action of the spring begins. Now said spring actually tends to advance the pillar 28 to its final position beneath axis A—A where its motion is limited in any suitable manner, such as by the engagement of a stop pin 50 on casing 38 with a portion of the head 31, as shown in Fig. 6, or by engagement of the X-ray tube with the shelf 15c, earlier referred to.

As a result of the foregoing the spring 35 not only serves to counterbalance the swinging pillar 28 carrying the X-ray tube against rotation, but it also tends to move it to and maintain it either in its upright position or in its depending position, whichever is the nearest.

Of course, when the table is vertical, as in Fig. 2, the pillar 28 is horizontal, and the lock 49 is utilized to hold the tube in its desired position, as will be readily understood.

Figs. 9 to 12 inclusive illustrate the mounting for the fluoroscopic screen unit, which is also supported and carried by the same column 27 which forms the base for the tube stand, although the screen unit and tube stand may be mounted upon separate carriages or sub-carriages, as will be readily understood. As illustrated, the screen unit includes a hollow head or casing 51 having a depending cylindrical base 52 journalled in an opening in an arm 53 extending laterally from the head 31 and confined therein in any suitable manner, such as by the screw 54. Within the hollow head 51 is pivotally mounted at 55 a base 56 in which is journalled an arm 57 carrying the usual fluoroscopic screen 8. The pivoted base 56 is provided with a hook-like extension 59 extending through an opening in and beneath a cross bar 60 of a member 61 having lateral projections 62 extending through and moving along inclined slots 63 in the side walls of the casing 51, said member beneath the side extensions having a cross bar 64 forming a perch for a loop at one end of a tension spring 65 whose other end is looped through the eye of an adjusting screw 66 threaded into the lower end of the depending cylindrical base 52. Member 61 is also provided with an upwardly extending finger lever 67 passing through an open slot in the casing wall.

The rotatable mounting of the cylindrical base 52 in member 53 permits the fluoroscopic screen to be swung at will either into position opposite the table top, as in Fig. 6, for use in fluoroscopic work, or to a position at one side of the table, as in Fig. 1, when the tube alone is used for radiographic work, the pivotal mounting of arm 57 in base 56 also enabling the screen to be turned into a vertical plane, as will be obvious.

Fig. 9 and Fig. 11 in full lines illustrate the position of the parts when the screen is opposite the table top ready for use in fluoroscopy. The cross bar 60 of member 61 is engaged in the hooked portion 59 of the screen supporting arm and spring 65 is extended and has stored energy sufficient to fully counterbalance the weight of the extended arm 57 and the screen supported thereby. Consequently, the table being in horizontal position, the attendant can move the screen toward and from the table to adapt it to the patient without undue effort. However, when the table is tilted to vertical position, as in Fig. 2, the weight of the parts constituting the screen unit requires no counterbalancing effort and were the spring not disconnected from arm 57, an operator could only manipulate the unit by exerting an effort equal to the tension of said spring, a matter of fifteen pounds or so. Improved means is therefore provided for enabling the counterbalancing spring to be disconnected from and made ineffective upon the screen carrying arm, said means being of such nature as to permit the parts to be readily connected to make the spring effective when the table is again moved to horizontal position.

When the table is moved to vertical position (assuming the screen opposite the table top for use in fluoroscopy) the energized spring 65 automatically tilts the screen carrying arm to the position shown in full lines Fig. 12. The pins 62 travel down to the lower ends of the slots 63 as spring 65 contracts and in the described position of the parts the operator can grasp the finger lever 67 and readily shift it from the full lines to the dotted line position, Fig. 12, thus disengaging the bar 60 from the notch in the hook. This operation wholly disconnects the tension spring from the screen carrying arm and the latter may be moved to the position shown in Fig. 9 and manipulated with respect to the patient without any necessity of the attendant overcoming the tension of the spring in so doing. During such manipulation the bar 60 is held by the tension of the spring against the outer surface of the hook 59, the spring 65 having a tendency to move said bar into a position in line with the length of the spring. Consequently, whenever it is desired to re-establish connection of the spring to the screen carrying arm, all that is necessary is to swing the arm outwardly to the position shown in full lines, Fig. 12, when, automatically, the spring will snap the bar 60 into position within the hook, restoring the connection and again making the spring effective on the arm for counterbalancing purposes when the table is restored to horizontal position.

This is a single construction for the purpose of enabling the spring to be very readily disconnected and made ineffective and automatically re-establishing connection in the ordinary course of manipulation of the parts.

The apparatus as a whole is of unusually simple construction as compared with prior devices for this purpose. It does away entirely with heavy, cumbersome rails at one side of the table along which the tube stand is adjusted with respect to the table, thus giving more foot room around the table, clearing the floor and reducing the over-all floor area occupied by the machine. Again, notwithstanding the fact that the adjustable parts are mounted directly upon the tilting table, they are fully counterbalanced so that the operator is always relieved of any heavy duty in the manipulation of these otherwise heavy parts. The tube is usable either on the front or on the rear face of the table in any position of the table and the screen unit may be readily moved to proper position for fluoroscopic use. All parts assume their proper positions semi-automatically with the least possible effort on the part of the operator.

Other advantages of the invention will be apparent to those skilled in the art.

What we claim is:

1. Apparatus of the character described, comprising a tilting table, a carrier movably mounted upon said table for adjustment to various positions thereon, an X-ray tube stand including a column supported by said carrier at one side of said table and extending beyond the table face, a fluoroscopic screen unit supported by said column, and a pillar adapted to support an X-ray tube and pivotally mounted upon said column on a horizontal axis above the table top.

2. Apparatus of the character described, comprising a tilting table having a top, a carrier movably mounted upon said table beneath its top for adjustment to various positions over the face thereof, an X-ray tube stand including a column supported by said carrier at one side of the table and extending beyond its face and rigid with said carrier, said stand also including a tube carrying pillar pivoted on said column on an axis located above the table top and extending transverse to the length of said table for adjustment to tube positions opposite either the exposed or reverse faces of the table top, and a fluoroscopic screen unit also supported by said column.

3. Apparatus of the character described, comprising a tilting table, a main carrier movably mounted upon said table for adjustment lengthwise thereof to various positions thereon, a sub-carriage movable transversely of the table on the main carrier, and an X-ray tube stand including a column supported by said sub-carriage and extending beyond the table face.

4. Apparatus of the character described, comprising a tilting table having a top, a main carrier movably mounted upon said table beneath its top for adjustment lengthwise of the table to various positions along the same, a sub-carriage movable transversely of the table upon the main carrier, and an X-ray tube stand including a column supported by said sub-carriage at one side of the table and extending beyond its top, said stand also including a tube carrying pillar pivoted on said column on an axis transverse to the length of said table and above its top for adjustment of the tube to positions opposite either the exposed or reverse faces of the table top.

5. Apparatus of the character described, comprising a tilting table, a main carrier movably mounted upon said table for adjustment lengthwise thereof to various positions thereon, a sub-carriage movable transversely of the table on the main carrier, an X-ray tube supported by said sub-carriage and adjustable thereon to positions opposite either the exposed or reverse faces of the table, and a fluoroscopic screen unit also supported by said sub-carriage.

6. Apparatus of the character described, comprising a tilting table, a main carrier movably mounted upon said table for adjustment lengthwise thereof to various positions thereon, a sub-carriage movable transversely of the table on the main carrier, an X-ray tube stand supported by said sub-carriage and extending beyond the table face, and a fluoroscopic screen unit also supported by said sub-carriage.

7. Apparatus of the character described, comprising a tilting table, a carrier movably mounted upon said table for adjustment to various positions thereon, a supporting column on said carrier extending beyond the exposed surface of the table, a pillar mounted upon said column for endwise adjustment and also for rotation about a transverse horizontal axis and supporting an X-ray tube at its outer end, and counterbalancing means for said pillar and the parts carried thereby.

8. Apparatus of the character described, comprising a tilting table, a carrier movably mounted upon said table for adjustment to various positions thereon, a supporting column on said carrier extending beyond the exposed surface of the table, a pillar slidably mounted upon said column and supporting an X-ray tube at its outer end, and spring counterbalancing means for said pillar and the parts carried thereby, said counterbalancing means including means providing uniform counterbalancing effect in all positions to which said pillar may be slidably adjusted.

9. Apparatus of the character described, comprising a tilting table, a carrier movably mounted upon said table for adjustment to various positions along the same, a supporting column mounted upon said carrier, a pillar mounted upon said column for swinging movement about a horizontal axis transverse to the table top, an X-ray tube supported by said pillar, and spring counterbalancing means for said swingable pillar having a tendency to maintain the same either in upright position with the tube opposite the exposed face of the table or in depending position with the tube opposite the reverse face of the table.

10. Apparatus of the character described, comprising a tilting table, a carrier movably mounted upon said table for adjustment to various positions along the same, a supporting column on said carrier extending beyond the exposed face of the table, a pivoted arm on said column carrying a fluoroscopic screen unit, spring counterbalancing means effective between said arm and said column, and a releasable connection between said spring means and said arm.

11. Apparatus of the character described, comprising a tilting table, a carrier movably mounted upon said table for adjustment to various positions thereon, gravity counterbalancing means for said carrier effective only when the latter has movement out of a horizontal plane, a slidable pillar mounted upon said carrier and supporting an X-ray tube at its outer end, spring counterbalancing means therefor, a fluoroscopic screen unit pivotally mounted upon said carrier, and spring counterbalancing means effective between said screen and carrier.

12. Apparatus of the character described, comprising a tilting table, a carrier movably mounted upon said table for adjustment to various positions thereon, gravity counterbalancing means for said carrier effective only when the latter has movement out of a horizontal plane, a slidable pillar mounted upon said carrier and supporting an X-ray tube at its outer end, counterbalancing means therefor, a fluoroscopic screen unit pivotally mounted upon said carrier, spring counterbalancing means effective between said screen and carrier, and a releasable connection between said spring means and said unit.

13. Apparatus of the character described, comprising a tilting table having a top, a main carrier movably mounted upon said table beneath its top for adjustment to various positions along the length of the table, a sub-carriage movable transversely of the table upon the main carrier, a column supported by and rigid with the sub-carriage and extending at one side of the table beyond its top, a fluoroscopic screen unit mounted near the upper end of said column and extending over the table top, and a pillar having an arm also extending over the table top and adapted to support an X-ray tube and pivotally mounted upon a horizontal axis on said column near its upper end, whereby the X-ray tube may be moved to positions either above or below the table top.

14. Apparatus of the character described, comprising a tilting table having a top, a main carrier movably mounted upon said table beneath its top for adjustment to various positions along the length of the table, a sub-carriage movable transversely of the table upon the main carrier, a column supported by and rigid with the sub-carriage and extending at one side of the table beyond its top, a fluoroscopic screen unit mounted near the upper end of said column and extending over the table top, and a pillar having an arm also extending over the table top and adapted to support an X-ray tube and pivotally mounted upon a horizontal axis on said column near its upper end, whereby the X-ray tube may be moved to positions either above or below the table top, said pillar being also slidable longitudinally in the vertical direction when in operating position to vary its distance from the table.

15. Apparatus of the character described, comprising a tilting table having a top, a main carrier movably mounted upon said table beneath its top for adjustment to various positions along the length of the table, a sub-carriage movable transversely of the table upon the main carrier, a column supported by and rigid with the sub-carriage and extending at one side of the table beyond its top, said column at its upper end being provided with a head, a fluoroscopic screen unit mounted upon said head for swinging motion about both horizontal and vertical axes, a supporting device rotatably mounted on a horizontal axis upon said head, and a pillar slidable vertically upon said supporting device and provided with an arm extending over the table top and adapted to support an X-ray tube.

EDWIN R. GOLDFIELD.
EDWARD B. GRAVES.